(12) United States Patent
Watanabe et al.

(10) Patent No.: US 8,650,060 B2
(45) Date of Patent: Feb. 11, 2014

(54) PLAN EXECUTION CONTROL APPARATUS, PLAN EXECUTION CONTROL METHOD, AND PLAN EXECUTION CONTROL PROGRAM

(75) Inventors: Tohru Watanabe, Zushi (JP); Hiroyuki Hori, Asaka (JP)

(73) Assignee: Hitachi, Ltd., Tokyo (JP)

( * ) Notice: Subject to any disclaimer, the term of this patent is extended or adjusted under 35 U.S.C. 154(b) by 259 days.

(21) Appl. No.: 12/466,296

(22) Filed: May 14, 2009

(65) Prior Publication Data
US 2009/0287530 A1 Nov. 19, 2009

(30) Foreign Application Priority Data
May 16, 2008 (JP) .................................. 2008-129016

(51) Int. Cl.
*G06Q 10/00* (2012.01)

(52) U.S. Cl.
USPC ............ 705/7.23; 370/248; 700/26; 702/184; 705/7.25; 709/224; 718/104

(58) Field of Classification Search
USPC ............ 370/248; 700/26; 702/184; 705/7.23, 705/7.25; 709/224; 718/104
See application file for complete search history.

(56) References Cited

U.S. PATENT DOCUMENTS

| | | | | |
|---|---|---|---|---|
| 5,216,612 A * | 6/1993 | Cornett et al. | ................... | 700/96 |
| 5,311,562 A * | 5/1994 | Palusamy et al. | .............. | 376/215 |
| 5,369,570 A * | 11/1994 | Parad | ........................... | 705/7.13 |
| 5,682,530 A * | 10/1997 | Shimamura | ................... | 718/104 |
| 6,839,597 B2 * | 1/2005 | Hattori et al. | ................... | 700/27 |
| 6,873,949 B2 * | 3/2005 | Hickman et al. | ................... | 704/9 |
| 6,952,828 B2 * | 10/2005 | Greene | .......................... | 718/104 |
| 7,082,383 B2 * | 7/2006 | Baust et al. | .................... | 702/184 |
| 7,113,780 B2 * | 9/2006 | McKenna et al. | ............... | 455/431 |
| 7,120,511 B1 * | 10/2006 | Tanzer et al. | ............... | 700/100 |
| 7,269,569 B2 * | 9/2007 | Spira et al. | .................... | 705/7.36 |
| 7,467,161 B2 * | 12/2008 | Frisina | ................................. | 1/1 |
| 7,475,122 B2 * | 1/2009 | Azpitarte | ...................... | 709/217 |
| 7,580,847 B2 * | 8/2009 | Black et al. | .................. | 705/7.22 |
| 8,126,840 B2 * | 2/2012 | Davis | ........................... | 707/608 |
| 2002/0087220 A1 * | 7/2002 | Tveit et al. | ...................... | 700/22 |
| 2002/0161614 A1 * | 10/2002 | Spira et al. | ........................ | 705/7 |
| 2003/0172002 A1 * | 9/2003 | Spira et al. | ....................... | 705/27 |
| 2004/0172175 A1 * | 9/2004 | Julich et al. | ..................... | 701/19 |
| 2005/0187739 A1 * | 8/2005 | Baust et al. | ................... | 702/184 |

(Continued)

FOREIGN PATENT DOCUMENTS

JP 02-069619 3/1990

*Primary Examiner* — Jonathan G Sterrett
*Assistant Examiner* — Stephen S. Swartz
(74) *Attorney, Agent, or Firm* — Foley & Lardner LLP (57) ABSTRACT

The invention provides a plan execution control apparatus, a plan execution control method and a plan execution control program capable of giving instructions for sensitively and efficiently maintaining even installations located in a wide range. The plan execution control apparatus includes a linkage reliability calculating section for calculating a target reliability of a single or a plurality of mutually related installations, a damaged state transition control section that provides a damaged state transition structure of the installations, a maintenance time limit calculating section for calculating a time limit related to the maintenance work to meet the target level of reliability of each key point and section, the constraint control section for recognizing and recording the constraints related to traveling of maintenance personnel, the traveling workload and the acceptable workload, and the itinerary maintenance determining section for calculating the itinerary schedule indicating the assignment to the object to be maintained.

17 Claims, 8 Drawing Sheets

(56) References Cited

U.S. PATENT DOCUMENTS

| | | |
|---|---|---|
| 2006/0041459 A1* | 2/2006 | Hester et al. .................. 705/8 |
| 2006/0184411 A1* | 8/2006 | Gross et al. .................. 705/8 |
| 2008/0049620 A1* | 2/2008 | Riga et al. .................. 370/236 |
| 2009/0204234 A1* | 8/2009 | Sustaeta et al. .................. 700/29 |
| 2010/0250448 A1* | 9/2010 | Towe .................. 705/302 |

* cited by examiner

PROCESSES OF ITINERARY MAINTENANCE CONTROL SYSTEM S EXECUTED BY PLAN EXECUTION CONTROL APPARATUS 1

MAINTENANCE TIME LIMIT CALCULATING STEP (STEP S33)

FIG.8

CONSTRAINT CONTROL STEP (STEP S34) AND
ITINERARY MAINTENANCE DETERMINING STEP (STEP S35)

FIG.9

PATH 1 TO B53 : B51→B52
PATH 2 TO B53 : B61→B62→B63→B64→B54

NUMBER OF TIMES OF WEEKLY REPAIR WORKS UNDER IMPLEMENTATION
OF ITINERARY MAINTENANCE OF EMBODIMENT

FIG.13B

NUMBER OF TIMES OF WEEKLY REPAIR WORKS UNDER IMPLEMENTATION
OF PERIODIC MAINTENANCE OF COMPARATIVE EXAMPLE

PLAN EXECUTION CONTROL APPARATUS, PLAN EXECUTION CONTROL METHOD, AND PLAN EXECUTION CONTROL PROGRAM

CROSS REFERENCE TO RELATED APPLICATIONS

This application claims the foreign priority benefit under Title 35, United States Code, §119 (a)-(d) of Japanese Patent Application No. 2008-129016, filed on May 16, 2008, in the Japan Patent Office, the disclosure of which is herein incorporated by reference in its entirety.

BACKGROUND OF THE INVENTION

1. Field of the Invention

The present invention relates to a system for planning and controlling maintenance of installations and more specifically to a plan execution control system, a plan execution control method and a plan execution control program that output instructions for efficiently maintaining broadly spread installations.

2. Description of Related Art

With recent slowing down of growth of power needs, maintenance and control of power installations is drawing increasing attention because it is not expected to improve reliability brought about by an increase of installations per area composed of linked line sections.

While various technologies are proposed to efficiently maintain the installations, the maintenance may be roughly categorized into two, that is, corrective maintenance and preventive maintenance.

The corrective maintenance is carried out to restore an installation into an operative state after its failure.

The preventive maintenance is carried out to keep an installation in a usable state by preventing it from breaking down. The preventive maintenance includes temporally planned maintenance (periodic maintenance), state monitoring maintenance and others.

Meanwhile, as control of the maintenance, operations of setting timing when inspection and repair should be conducted and of conducting maintenance works according to changes of states are carried out. As such technology, Japanese Patent Application Laid-Open No. H02-69619 (see Claims, FIGS. 1 through 4 and others), for example, predicts an occurrence of failure from statistical evaluation of life and evaluates whether or not an appropriate maintenance is carried out if the occurrence of failure is predicted.

The state monitoring maintenance in the category of the conventional preventive maintenance described above is applicable when installations to be maintained aggregate around a base of maintenance. However, it is difficult to maintain installations located in a wide area from several tens to several hundreds square kilometers by a limited number of maintenance personnel. That is, it is difficult to monitor changes of states when the installations to be maintained located in the wide area from several tens to several hundreds square kilometers and it also takes a large amount of time to restore the installations including a traveling time of the maintenance personnel to go to a site where a state change occurs.

Meanwhile, in the case of carrying out the temporally planned maintenance such as the periodic inspection and periodic replacement in the category of the preventive maintenance for the installations spread in the wide area, the maintenance personnel, materials and equipment are assigned to the installations under a plan of maintaining the installation of which district on which month and day. However, because the standard for carrying out the maintenance in the temporally planned maintenance is designed to control inspection time intervals of each individual installation independently of the others, there is a problem that this method permits to keep soundness of only each individual installation.

If the installations located in the wide range provide services to users by linking with each other, a range and scale of the services damaged by a state change such as a failure of the installation differ depending on a network composed of the installations. For instance, electricity distribution lines linked from a power substation are divided into line sections in a power distribution system. It is normally necessary to charge neighboring line sections when power is to be fed to a certain line section. Still more, because electric power is supplied from a high-voltage installation to a lower-voltage installation even in one line section, electricity must be charged properly to the high-voltage installation in order to charge the low-voltage installation.

Thus, it is necessary to maintain upstream installations more steadily in a flow of electric power so that the installations keep their function. However, the temporally planned maintenance that uniformly plans maintenance has a problem that it is unable to suitably maintain such installations linked with each other as described above.

It is not possible to maintain the installations such as a power network located in a wide area highly reliably and efficiently while keeping a maintenance time required for traveling and others short. At this time, a maintenance system alternative for the periodic inspection and periodic replacement has not yet been established regarding the electricity distribution installations.

This appears to result from an operation in which a limited number of personnel is each assigned to inspect a certain installation in a certain district on a certain month of a certain year so as to maintain the installations geographically located in the wide area of several hundreds square kilometers. Still more, because a failure of an individual installation is not always directly related to a failure of a system having the installation, there is a difficulty that minimization of failures of individual installations does not always contribute to attainment of good maintenance of the system.

In view of the actual situation described above, the present invention has been made in an attempt to provide a plan execution control apparatus, a plan execution control method, and a plan execution control program, capable of giving instructions for carefully and efficiently maintaining even installations that are located in a wide area based on a damaged state and a linkage state of the installations as well as a travel time and a workload of personnel.

SUMMARY OF THE INVENTION

According to a first aspect of the invention, a plan execution control apparatus for giving an instruction for maintaining installations includes a linkage reliability calculating section for calculating a target reliability indicating a probability that a target installation among one or a plurality of mutually related installations is normally used, a damaged state transition control section that provides a damaged state transition structure of the installation, a maintenance time limit calculating section for calculating a time limit related to a maintenance work to meet a target value of reliability of each key point and section, a constraint control section for recognizing and recording constraints related to traveling of maintenance personnel, a traveling workload, and a workload and an itinerary maintenance determining section for calculating an itinerary schedule indicating an assignment to an object to be maintained among the installations.

According to a second aspect of the invention, a plan execution control method for giving an instruction for maintaining installations includes a linkage reliability calculating step for calculating a target reliability indicating a probability that a target installation among one or a plurality of mutually related installations is normally used, a damaged state transition control step that provides a damaged state transition structure of the installation, a maintenance time limit calculating step for calculating a time limit related to a maintenance work to meet a target value of reliability of each key point and section, a constraint control step for recognizing and recording constraints related to traveling of maintenance personnel, a traveling workload, and a workload and an itinerary maintenance determining step for calculating an itinerary schedule indicating an assignment to an object to be maintained among the installations.

According to a third aspect of the invention, a plan execution control program for giving an instruction for maintaining installations executes a linkage reliability calculating procedure for calculating a target reliability indicating a probability that a target installation among one or a plurality of mutually related installations is normally used, a damaged state transition control procedure that provides a damaged state transition structure of the installation, a maintenance time limit calculating procedure for calculating a time limit related to a maintenance work to meet a target value of reliability of each key point and section, a constraint control procedure for recognizing and recording constraints related to traveling of maintenance personnel, a traveling workload, and a workload and an itinerary maintenance determining procedure for calculating an itinerary schedule indicating an assignment to an object to be maintained among the installations.

Other features and advantages of the present invention will become more apparent from the following detailed description of the invention, when taken in conjunction with the accompanying exemplary drawings.

BRIEF DESCRIPTION OF DRAWINGS

FIGS. 13A and 13B are graphs respectively showing the number of times of repair works per week, wherein FIG. 13A shows a case where the itinerary maintenance according to the present embodiment is carried out and FIG. 13B shows a comparative case where a conventional periodic maintenance is carried out.

BEST MODE FOR CARRYING OUT THE INVENTION

An embodiment of the present invention will be explained below with reference to the drawings.

<<Outline of Plan Execution Control Apparatus 1>>

Figure 1:
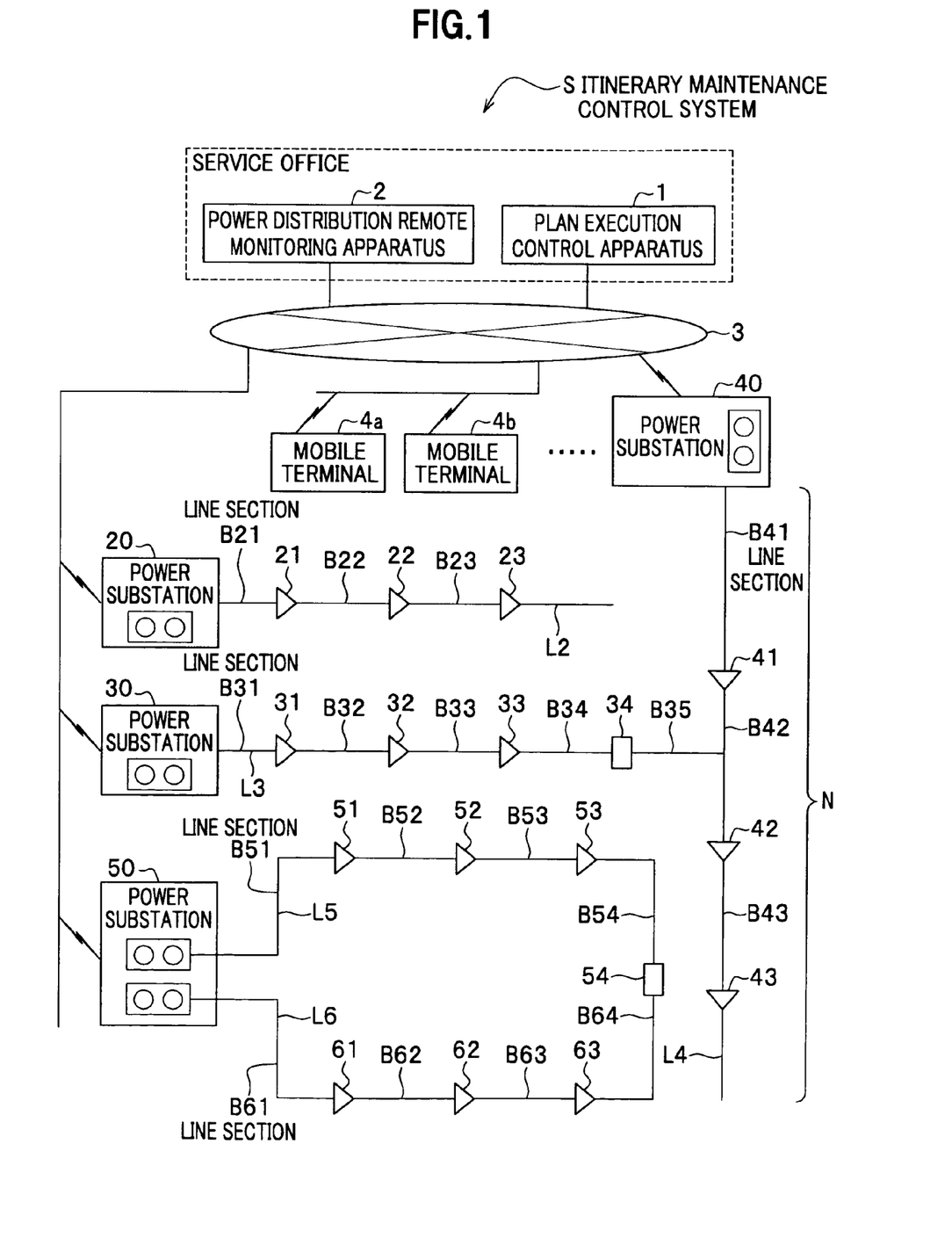
FIG. 1 is a block diagram showing an exemplary hardware structure of an itinerary maintenance control system according to an embodiment of the invention.

FIG. 1 is a block diagram showing an exemplary hardware structure of an itinerary maintenance control system S according to an embodiment of the present invention.

The embodiment of the invention provides the itinerary maintenance control system S (see FIG. 1) of a plan execution control apparatus 1 for drawing up a maintenance work plan of electricity distribution installations.

Figure 4:
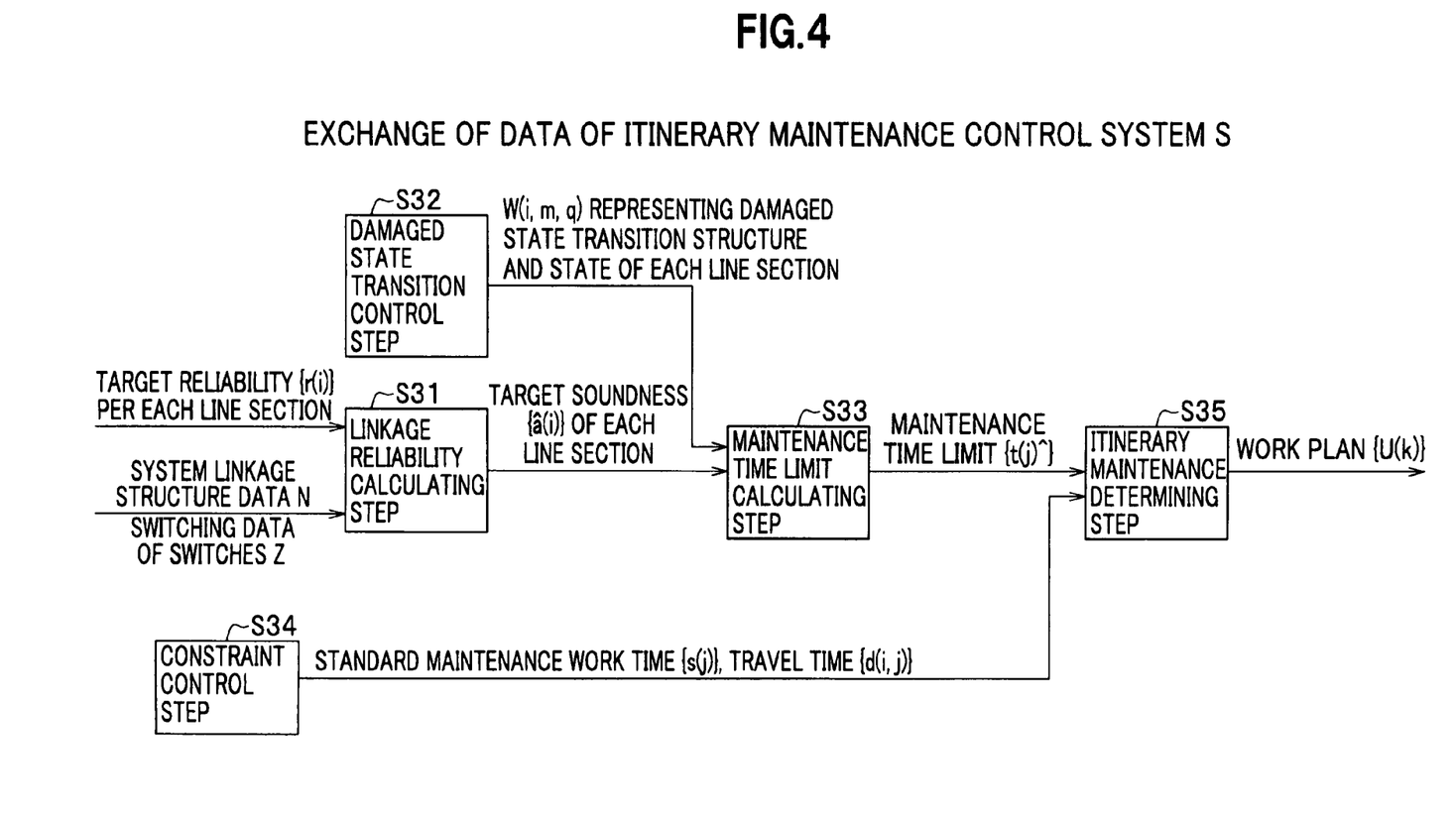
FIG. 4 is a data flow chart showing a data exchange relationship of the process of the itinerary maintenance control system of the plan execution control apparatus according to the embodiment of the invention.

FIG. 4 is a data flow chart showing exchanges of processing data of the itinerary maintenance control system of the plan execution control apparatus 1.

As shown in FIG. 4, the processes of the plan execution control apparatus 1 shown in FIG. 1 includes a linkage reliability calculating step (Step S31) of calculating a target soundness that is a target value of a probability that line sections B21, B31, B41, B51 and so on of the power distribution installations (see FIG. 1) are not faulty, a damaged state transition control step (Step S32) of controlling transition of damaged states of the line sections of the distribution installations, a maintenance time limit calculating step (Step S33) of calculating a maintenance time limit of the line sections of the distribution installations, a constraint control step (Step 34) of controlling a standard maintenance work time, a time in traveling among work sites and others, and an itinerary maintenance determining step (Step S35) of finally planning a work plan by using processing results of those functions.

This arrangement aims at improving an efficiency of maintenance works of the power distribution installations by planning the maintenance work plan of the installations by setting the maintenance time limit by using the structure, reliability, damaged state and others of the respective line sections B21, B31, B41, B51 and so on of the power distribution installations and by considering the maintenance work time, the time for travelling among the work sites and others.

It is noted that the embodiment of the invention will be explained assuming that the installations located in a wide range are power distribution installations. However, the invention is not limited to this.

<<Whole Structure of Itinerary Maintenance Control System S>>

The itinerary maintenance control system S shown in FIG. 1 includes the plan execution control apparatus 1 for conducting processes for planning the distribution installation maintenance plan, a power distribution remote monitoring apparatus 2 for monitoring states of the distribution installations, and a communication network 3 for communicating with the installations and equipment such as switches 21, 31, 41, 51, 61 and so on provided outside of the apparatus.

Herein, the plan execution control apparatus 1 and the power distribution remote monitoring apparatus 2 are installed in a service office or the like in a wide area, e.g., one service office covering a large city or several cities in a prefecture.

The structure of the respective sections of the itinerary maintenance control system S will be explained below.

<Power Distribution Remote Monitoring Apparatus 2>

The power distribution remote monitoring apparatus 2 shown in FIG. 1 monitors power distribution states of the respective line sections B21, B31. B41, B51, B61 and so on composed of electric wires of a predetermined distance in an urban area or the like by recognizing states of switches 21, 31, 41, 51, 61 and so on (shown in triangular marks in FIG. 1).

When a blackout occurs, for example, the power distribution remote monitoring apparatus 2 is used to find the line section where a trouble such as earth fault, disconnection or the like is occurring by sequentially turning on the switches 21, 31, 41, 51, 61 and so on by using a timer after turning off the switches by an automated power distribution system.

It is noted that the distance of one line section is about 200 meters for example, and power is distributed to around 60 houses of general customers through a transformer.

<Communication Network 3, Mobile Terminals 4*a*, 4*b* and Others>

The communication network 3 is a communication network such as the Internet and plays a role of connecting information and telecommunications among the mobile terminals 4*a* and 4*b* such as a PDA (Personal Digital Assistant) used by the maintenance personnel of the electric power system for inputting/outputting information on each site and power substations 20, 30, 40, 50 and so on.

The maintenance personnel goes to the site and inputs a deterioration state of the line sections B21, B31 and so on through the mobile terminals 4*a*, 4*b* and so on. This input data is transmitted to the plan execution control apparatus 1 via the communication network 3 and is used for processings in the itinerary maintenance control system S by the plan execution control apparatus 1.

It is noted that the communication network 3 may be connected also to a WAN (Wide Area Network) dedicated line and the like and is not specifically limited thereto.

<Structure of Power Distribution>

As shown in FIG. 1, distribution line paths L2 through L6 are drawn out of the respective power substations 20, 30, 40, 50 and so on to supply power for home use or the like.

The distribution lines composing the distribution line paths L2 through L6 are electrically connected by the switches 21 through 23, 31 through 33, 41 through 43, 51 through 53, and 61 through 63, respectively. The distribution lines between the switches 21 through 23 and 31 through 33 and so on are called as line sections B21, B31 and so on.

Thus, the distribution installation is arranged so as to electrically connect the respective line sections B21, B31 and so on by closing the switches 21 through 23, 31 through 33, 41 through 43, 51 through 53, and 61 through 63 and to electrically disconnect by opening the switches 21 through 23 and so on. When an earth fault accident occurs in a certain line section, for example, the distribution installation is made possible to open the switches 21 through 23 and so on of the both ends of the line section, i.e., to disconnect electricity, in order to prevent the accident from affecting the other line sections.

In addition to the switches 21 through 23 and so on, connecting switches 34 and 54 (shown by square marks in FIG. 1) for connecting the distribution lines are installed in the distribution line paths L2 through L6.

Although the connecting switches 34 and 54 are normally opened. i.e. disconnect electricity, they are closed when an accident such as a blackout occurs so as to supply power to load-side sections without trouble across the distribution lines.

When an accident such as earth fault occurs in the line section B52 under control of the power substation 50 in FIG. 1 for example, distribution of power to the line sections B53 and B54 located beyond the line section B52 stops if there is no connecting switch 54. However, it is possible to supply power to the line sections B54 and B53 through the line section B64 across the distribution lines by closing the connecting switch 54. Thus the connecting switches keep the blackout within the minimum line section.

Information concerning such switching states of the switches 21 through 23 and so on and the connecting switches 34 and 54 and such accident state of the respective line sections B21, B31 and so on is transmitted to the power distribution remote monitoring apparatus 2, the plan execution control apparatus 1 and others connected with the communication network 3 through the power substations.

<<Plan Execution Controlling Apparatus 1>>

Figure 2:
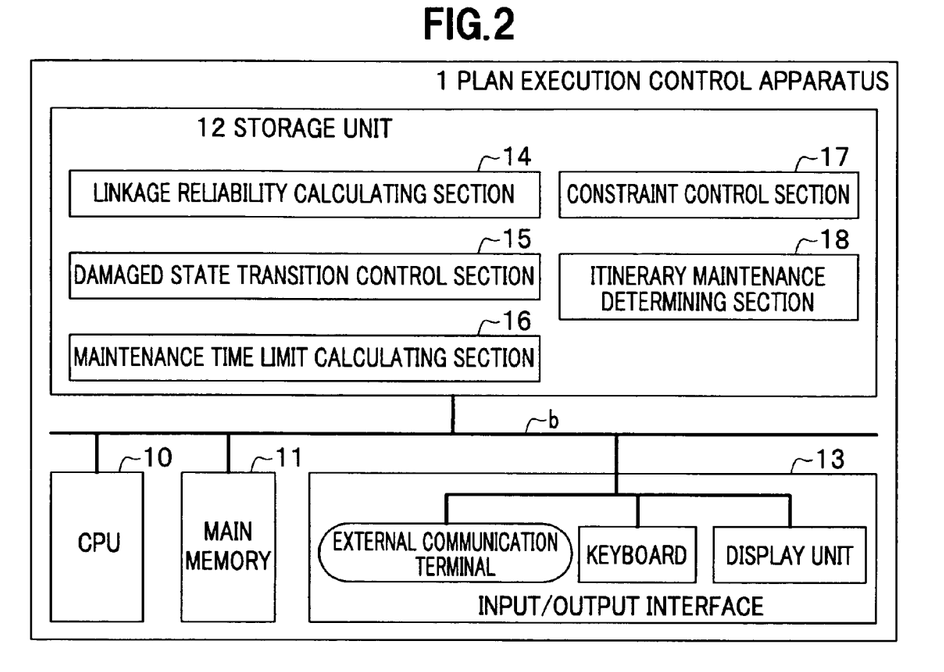
FIG. 2 is a block diagram showing a structure of a plan execution control apparatus according to the embodiment.

FIG. 2 is a block diagram showing a structure of the plan execution control apparatus 1.

The plan execution control apparatus 1 is a server for example and includes a CPU (Central Processing Unit) 10, a main memory 11, a storage unit 12 storing an itinerary maintenance control system program for operating the itinerary maintenance control system S and an input/output interface 13 such as a keyboard, a display unit and external communication terminals connected with the communication network 3 shown in FIG. 1. These components are connected by buses b and others.

The storage unit 12 is composed of a HDD (Hard Disk Drive) and others and stores the itinerary maintenance control program that realizes functions of a linkage reliability calculating section 14 for calculating a soundness of installations that gives a target reliability of a controlled unit composed of a single or plurality of installations such as the line sections B21, B31 and so on (see FIG. 1), a damaged state transition control section 15 that gives a transition structure of a damaged state of the installations, a maintenance time limit calculating section 16 for calculating a time limit related to a maintenance work so that the reliability of each key point or section meets a target level, a constraint control section 17 for recognizing and recording constraints related to traveling of the site personnel and acceptability of a traveling workload and maintenance workload, an itinerary maintenance determining section 18 for calculating an itinerary schedule specifying assignment to an object to be maintained, and others.

The CPU 10 realizes the respective functions by reading, executing and processing the program from the storage unit 12 to the main memory 11 in operating the itinerary maintenance control system S.

It is noted that the functions of the aforementioned sections 14, 15, 16, 17 and 18 may also be realized by hardware. Still more, the program for realizing the aforementioned functions may be shifted from a storage medium such as a CD-ROM (Compact Disk Read Only Memory) and others or may be downloaded from another device via the communication network 3.

<<Maintenance Operation Related to Itinerary Maintenance Control System S of Plan Execution Control Apparatus 1>>

Next, maintenance operations related to the itinerary maintenance control system S will be explained.

While maintenance activities range widely, they are mainly divided into three activities, that is, preventive maintenance, dealing with a trouble, and maintenance control. Their outlines are as follows.

The preventive maintenance of the first activity described above is an activity of confirming whether or not a power distribution system in operation functions normally, of discovering a trouble or predicting a sign leading to a trouble and of taking a necessary measure. Inspections and periodic replacements correspond to the preventive maintenance.

The inspection is an activity of investigating a state of each device of the distribution installation. For instance, the maintenance personnel obtains a circumstance that may possibly cause a trouble to distribution line paths such as overhang and closely situated trees, buildings and other structures around the path by using his/her human five senses. Or, the maintenance personnel investigates a state of a concrete ground, deformation or curved members, development of rust on members and bolts, loose bolts and a ground resistance related to foundation parts, investigates abnormalities such as corrosion, damages and discharge traces of the cables and investigates abnormalities such as cracks, looseness and deformation of line hardware of insulators.

The second activity of dealing with a trouble of is an activity of obtaining a faulty site when a trouble occurs in the system in operation and of restoring the system into a sound state by replacing or repairing the faulty site. Other than the restoration from the trouble, this activity may also include such activities as investigating a cause of the trouble and making a countermeasure for the trouble.

The maintenance control of the third activity is to assure resources such as personnel, materials and equipment for adequately and efficiently carrying out the preventive maintenance of the first activity and dealing with a trouble of the second activity and is to manage records of operations carried out.

The present embodiment recognizes states of installations and states of personnel through various monitoring means and plans and manages adequate and efficient activities to assure the resources for carrying out the preventive maintenance and dealing with the troubles as part of the maintenance control.

<<Processing of Itinerary Maintenance Control System S by Plan Execution Control Apparatus 1>>

Figure 3:
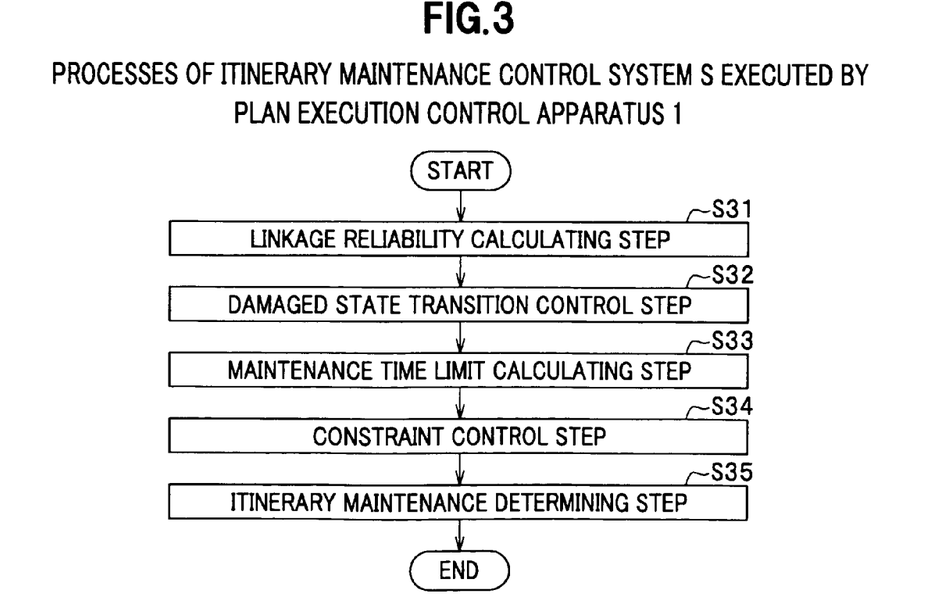
FIG. 3 is a flowchart showing processes of an itinerary maintenance control system S of the plan execution control apparatus according to the embodiment.

Next, processing of the itinerary maintenance control system S will be explained with reference to FIGS. 3 through 8. FIG. 3 is a flowchart showing the processing of the itinerary maintenance control system S of the plan execution control apparatus 1.

FIG. 4 shows exchanges of main data related to the processing of the plan execution control apparatus 1 shown in FIG. 3.

As shown in FIGS. 3 and 4, the process of the itinerary maintenance control system S conducted by the plan execution control apparatus 1 includes a linkage reliability calculating step (Step S31) of obtaining the target soundness to be satisfied by the line sections B21, B22 and so on (see FIG. 1) of the system from the target reliability {r(i)} of each line section B21. B22 and so on of the system, data N of the system linkage structure and data Z indicating switching states of the switches 21 through 23 and so on. It is noted that the soundness is a degree representing a probability that a certain installation is not faulty and the target soundness is a target value of the soundness. The reliability is a degree representing a probability if the installation is achieving the power distribution, i.e., a service to be achieved by the installation, and the target reliability is a target value of the reliability.

The processes of the itinerary maintenance control system S conducted by the plan execution control apparatus 1 also include a damaged state transition control step (Step S32) of giving the transition structure (see FIG. 1) of the damaged state of the line sections B21 and so on of the installation, a maintenance time limit calculating step (Step S33) of calculating a time limit related to the maintenance work, a constraint control step (Step 34) of recording constraints mainly related to the site personnel, and an itinerary maintenance determining step (Step S35) of calculating an itinerary schedule related to the maintenance.

Herein, the processes of the linkage reliability calculating step (Step S31), the damaged state transition control step (Step S32), the maintenance time limit calculating step (Step S33), the constraint control step (Step 34), and the itinerary maintenance determining step (Step S35) are carried out respectively by executing the program corresponding to the linkage reliability calculating section 14, the damaged state transition control section 15, the maintenance time limit calculating section 16, the constraint control section 17, and the itinerary maintenance determining section 18 each stored in the storage unit 12 shown in FIG. 2 as described above.

The processes of the plan execution control apparatus 1 will be detailed below.

<<Linkage Reliability Calculating Step (Step S31): see FIGS. 3 and 4>>

The linkage reliability calculating step (Step S31) shown in FIGS. 3 and 4 will be explained along with FIG. 5. It is noted that FIG. 5 is a flowchart showing the detail of the linkage reliability calculating process (Step 31) shown in FIG. 3.

The plan execution control apparatus 1 shown in FIG. 1 carries out the process of this linkage reliability calculating process (Step 31) by executing the corresponding program of the linkage reliability calculating section 14.

Figure 5:
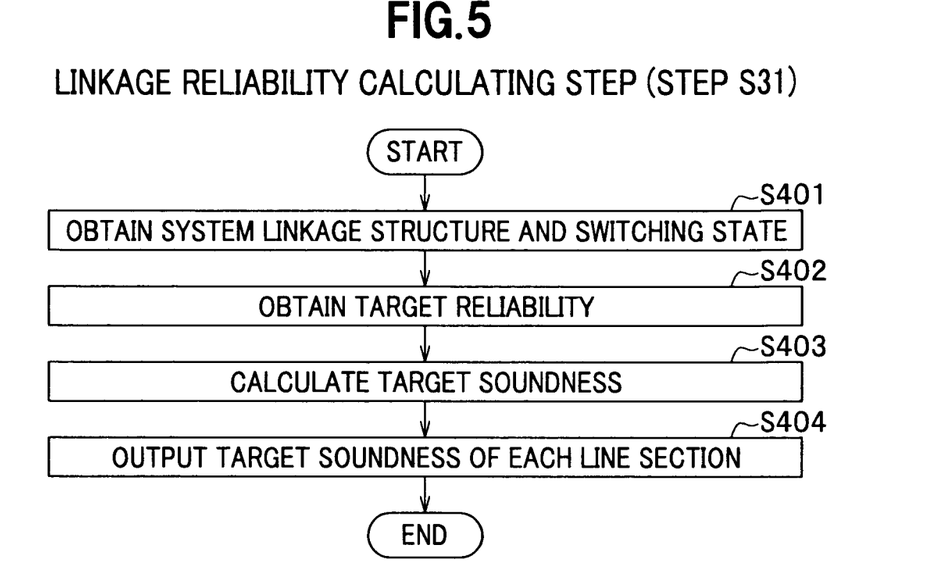
FIG. 5 is a flowchart showing a detail of a linkage reliability calculating process (Step S31)

When the plan execution control apparatus 1 starts the process, it obtains the system linkage structural data N (see FIG. 1) that is a graph representing connecting and branching structures of the line sections B21, B22 and so on of the lines of the system and places where the switches 21 through 23 and so on are installed, and the data Z showing the switching state of the switches 21 through 23 and so on of the system information (it is found if there is a trouble in a line section from On/Off state of the switches 21 through 23 of the section interposing the line sections B21, B22 and so on) (Step S 401 in FIG. 5). The plan execution control apparatus 1 also obtains the target reliability {r(i)} of each of the line sections B21, B22 and so on of the system of N inputted by the maintenance personnel (Step S402 in FIG. 5). It is noted that "i" is a serial number identifying the respective line sections B21, B22 and so on.

The reliability {r(i)} may be thus inputted through the input/output interface 13 shown in FIG. 2 or may be stored as data inputted in advance into the storage unit 12 and read out from the storage unit 12 at the time of processing (see FIG. 2).

Next, the plan execution control apparatus 1 calculates the target soundness "a" (Step S403 in FIG. 5). It is noted that the soundness "a" is degree representing a probability that an installation of a certain line section is not faulty. There is a case where no power can be fed by a malfunction of an installation connected on a power supply side even if the installation of the certain line section itself is not faulty. For instance, no power is fed to the line section B53 even if the section is not faulty if the line section B52 connected on the power supply side is faulty. The target soundness "a" is literally a target value of the soundness "a". Step S403 in FIG. 5 is carried out as follows.

Figure 9:
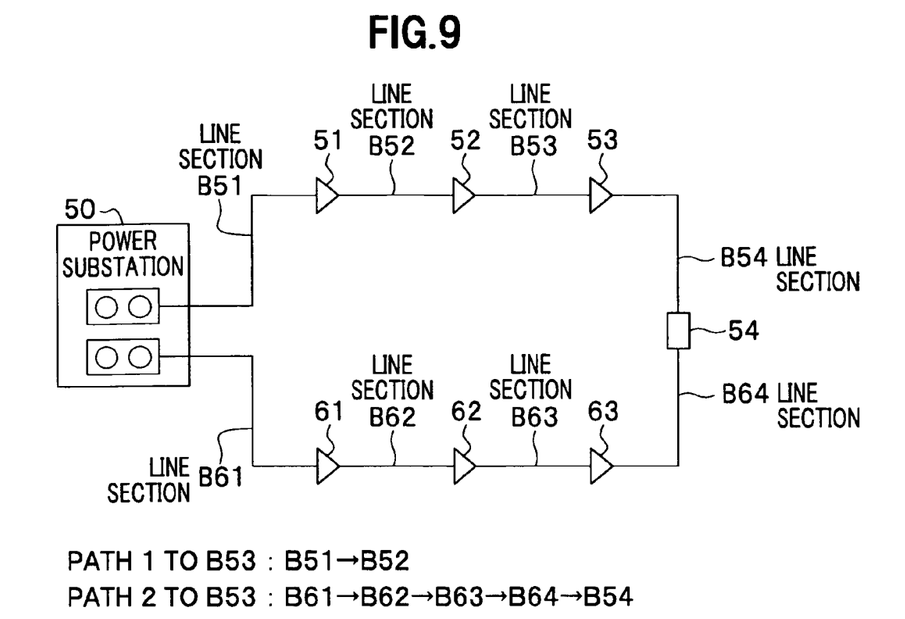
FIG. 9 is a block diagram for explaining the linkage reliability calculating step (Step S31)

The plan execution control apparatus 1 enumerates paths reachable to the line section B53 shown in FIG. 9 for example by connecting the line sections B51, B52 and so on parted by the switches 51, 52 and so on (indicated by triangular marks in FIG. 9) starting from the power substation 50 by making reference to the system linkage structure data N and the switching condition data Z described above. For instance, the plan execution control apparatus 1 enumerates a path 1 (B51→B52→B53) and a path 2 (B61→B62→B63→B64→B54→B53) with respect to the line section B53. Then, the plan execution control apparatus 1 acquires an expression formula of the reliability of the line section B53 by the enumerated paths by using variables a(i) representing the soundness of the line sections B51, B52 and so on. It is noted that FIG. 9 is a block diagram for explaining the linkage reliability calculating step (Step S31).

For instance, as shown in FIG. 9, the reliability "r" of the path 1 is:

$$r(B51 \to B52 \to B53) = a(B51) \times a(B52) \times a(B53)$$

and the reliability r of the path 2 is:

$$r(B61 \to B62 \to B63 \to B64 \to B54 \to B53) = a(B61) \times a(B62) \times a(B63) \times a(B64) \times a(B54) \times a(B53)$$

The plan execution control apparatus 1 updates the target soundness "a(i)" of the line section i on the enumerated path so that the reliability given by the enumerated path becomes equal to or more than the line section reliability target value "r(B53)?".

In the case described above for example, power is supplied to the B53 through the path 1 or 2, so that the reliability "r" of the line section B53 is a probability that the both paths cause no trouble at the same time. That is:

$$r(B53) = \{1 - (1 - r(B51 \to B52)) \times (1 - r(B61 \to B62 \to B63 \to B64 \to B54))\} \times a(B53)$$

That is, the reliability "r(B53)" is obtained by obtaining the reliability of the paths 1 and 2 (excluding B53) by subtracting a product of a degree of failure that is an inverse value of the reliability of the path 1 (excluding B53) and of a degree of failure that is an inverse value of the reliability of the path 2 (excluding B53) and by multiplying the product value of the reliability of the paths 1 and 2 with the soundness "a(B53)" of the line section B53.

If the soundness "a(B51)" through "a(B64)" of the respective line sections are assumed to be take a certain value "a", the soundness of the path 1 is "$a^2$" because there are two line sections of B51 and B52 in the path 1 to the line section B53 as shown in FIG. 9 and the soundness of the path 2 to the line section B53 is "$a^5$" because there are Five line sections of the line sections B61, B62, B63, B64 and B54.

Accordingly, the reliability of the paths 1 and 2 to the line section B53 is obtained by subtracting the soundness "$a^2$" of the path 1 from 1, subtracting the soundness "$a^5$" of the path 2 from 1 and by subtracting a product of those subtracted values from 1. The reliability "r(B53)" of the line section B53 is obtained by multiplying this value with the soundness a of the line section B53 itself. That is, the reliability "r(B53)" of the line section B53 is expressed as follows:

$$R(B53) = \{1 - (1 - a^2)(1 - a^5)\} \times a \quad (1)$$

Then, the plan execution control apparatus 1 obtains a lower limit of "a" of "r(B53)" that meets the target reliability "r(B53)?" from the formula (1) and updates this as values of the target soundness "a(1)" for the line sections 1 on the path (B51, B52, B61, B62, B63, B64, B54, B53). However, the plan execution control apparatus 1 does not rewrite if a value of the existing soundness "a" is larger than that of the target soundness "a".

The plan execution control apparatus 1 obtains the target soundness "a(i)" of the line section by repeatedly carrying out the above-mentioned process to the entire line sections. It is noted that "i" is a variable representing each line section.

Herein, if the target soundness "a(j)" is specifically given to a specific line section "j" or an actual soundness is observed, those values may be given as an initial value of the target soundness "a(i)" (Step S403 in FIG. 5).

Next, the target soundness "a(i)" of the line sections obtained from the repetitive calculation is output (Step S404 in FIG. 5).

The linkage reliability calculating process (Step 31) (see FIGS. 3 and 4) is carried out as described above.

<<Damaged State Transition Control Step (Step S32) (see FIGS. 3 and 4)>>

Figure 6:
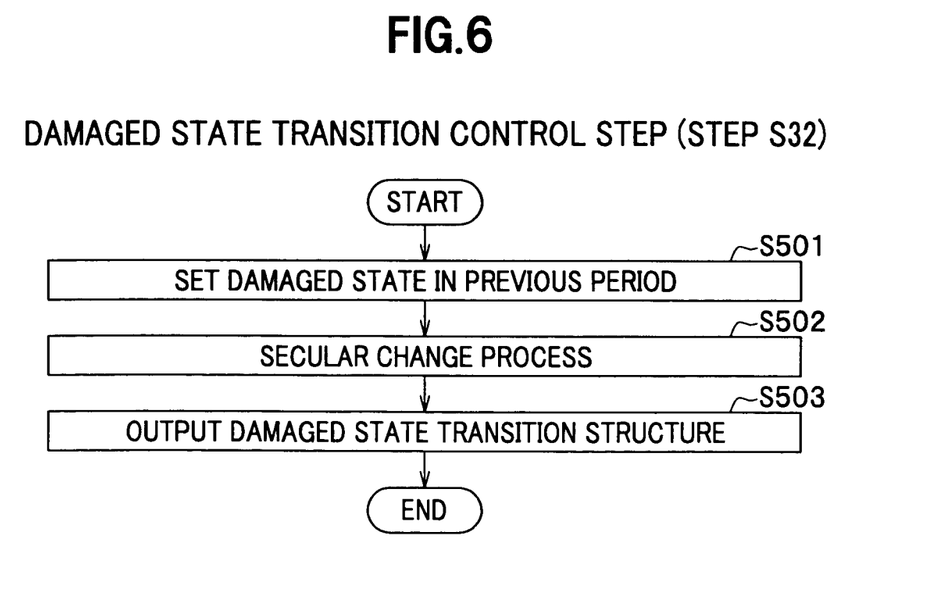
FIG. 6 is a flowchart showing a detail of a damaged state transition controlling process (Step S32)

Next, the damaged state transition control step (Step S32) shown in FIGS. 3 and 4 is explained along with FIG. 6. It is noted that FIG. 6 is a flowchart showing a detail of the damaged state transition control process (Step S32).

Figure 10:
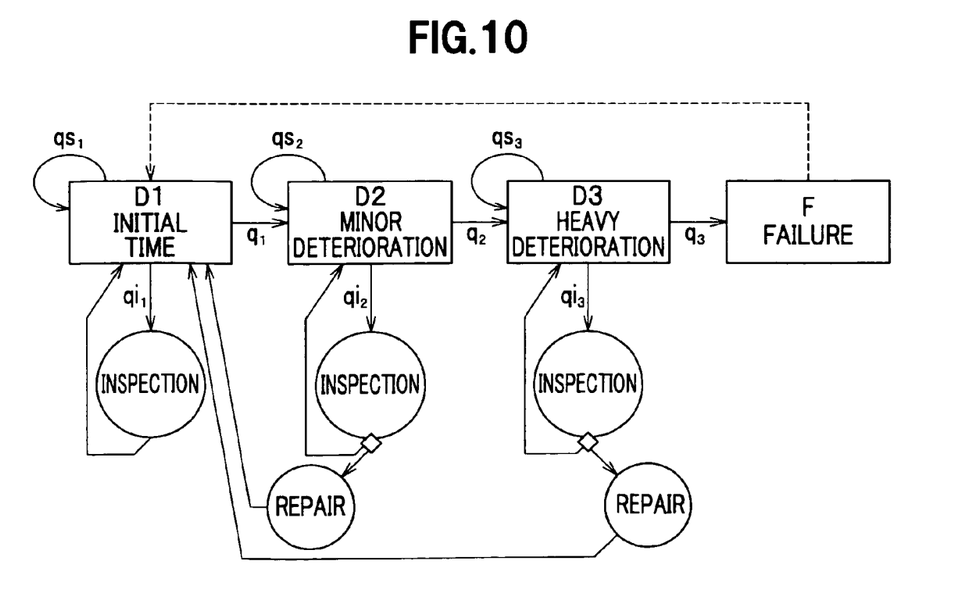
FIG. 10 is a chart showing an example of a deterioration transition model.

In the damaged state transition control process (Step S32), the plan execution control apparatus 1 manages a deterioration transition model shown in FIG. 10 related to each line section "i". FIG. 10 is a chart showing a example of the deterioration transition model.

As shown in FIG. 10, the plan execution control apparatus 1 represents transition states of the installations within the line sections B21, B22 and so on as multistage states from an initial state D1 to an actual failure F via a minor deterioration state D2 and a heavy deterioration state D3. If a line section includes installations installed near the ocean and prone to be damaged by seawater, the line section may suffer a short-circuit accident (failure F) through a cleaned state (initial state D1), a state in which salt starts to adhere to insulators (minor deterioration state D2), a state in which the salt starts to crystallize around the insulators (heavy deterioration state D3). In a case of another example, a line section in mountains transits through a state in which trees around distribution lines are cut down (initial state D1), a state in which trees grow closer to the distribution lines (minor deterioration state D2), a state in which part of branches of the trees lean to the distribution lines (heavy deterioration state D3) and a short-circuit accident (failure F) that may be caused by the branches straddling over the distribution lines.

The damaged state transition control step (Step S32) shown in FIGS. 3 and 4 is explained along with FIG. 6 and with reference to FIG. 10.

The plan execution control apparatus 1 determines a state of a line section, i.e., the initial D1 state, the minor deterioration D2 state, the heavy deterioration D3 state, or the failure F based on results of the inspections and repairs carried out in the previous plan execution period in Step S501 in FIG. 6. For a line section that has not been inspected, the plan execution control apparatus 1 duplicates a state distribution obtained in the previous plan execution period, i.e., a distribution of any one of the deterioration states shown in FIG. 10.

Next, the plan execution control apparatus 1 conducts a secular change process. That is, the plan execution control apparatus 1 obtains a deterioration state distribution "m(i)" at the end of this period from a state distribution "pre_m(i)" in the previous period by multiplying the state transition probability statistically obtained, i.e., by multiplying the probabilities with which the deterioration states represented by values such as q1 through q3 shown in FIG. 10 advance.

Next, the plan execution control apparatus 1 outputs a damaged state transition structure that is the deterioration transition model shown in FIG. 10 per line section in Step S503 in FIG. 6.

The damaged state transition control process (Step S32) is carried out as described above.

It is noted that although this example illustrates the case of categorizing the damaged states of the installations into the plurality of stages including the initial state D1, the minor deterioration state D2, the heavy deterioration state D3, and the failure F, the damaged states of the installations may be categorized by means of continuous values.

<<Maintenance Time Limit Calculating Step (Step S33) (see FIGS. 3 and 4)>>

Figure 7:
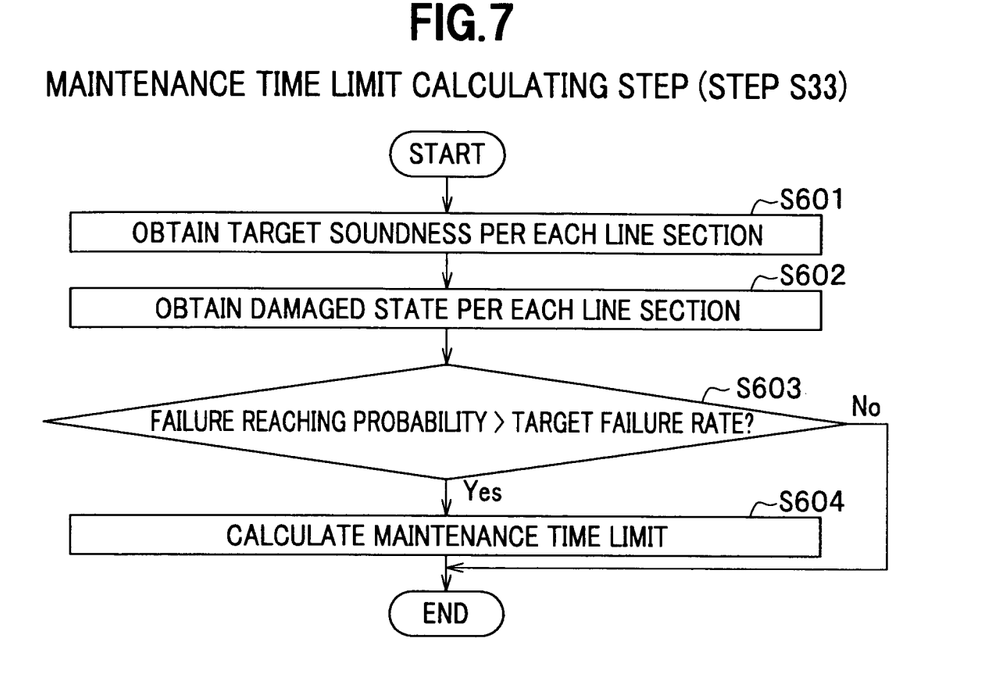
FIG. 7 is a flowchart showing a detail of a maintenance time limit calculating process (Step S33)

Next, the maintenance time limit calculating step (Step S33) shown in FIGS. 3 and 4 is explained along with FIG. 7. FIG. 7 is a flowchart showing a detail of the maintenance time limit calculating process (Step S33).

At first, the plan execution control apparatus 1 obtains the target soundness {a(i)} per each line section obtained in the linkage reliability calculating process (Step S31) described above in Step S601 in FIG. 7 and obtains data W (i, m, q) representing the damaged state transition structure shown in FIG. 10 per each line section obtained in the damaged state transition control process (Step S32) (see FIG. 6) described above, the deterioration state distribution "m(i)" at the end of this period and the state transition probability. It is noted that "i" in the data W(i, m, q) is a number indicating each line section and "m" indicates a deterioration state of the line section "i". "q" in the data W(i, m, q) is a rank of the transition probability of the line section "i". When a state of the line section is in the minor deterioration state D2 in FIG. 10 for example, a probability of becoming the heavy deterioration state D3 is 80%, a probability that the present state is kept is 10% and a probability of becoming the initial state D1 as a result of inspection and repair is 10%. That is, "q" corresponds to the ranks of the transition probabilities of 80%, 10% and 10%.

Next, the plan execution control apparatus 1 obtains a probability that the line section "i" falls into the failure state F (see FIG. 10), i.e., a probability that the line section becomes unsound, from W for the whole line section "i" and compares it with a target failure rate (1−a(i)) in Step S603 in FIG. 7.

If the plan execution control apparatus 1 determines in Step S603 in FIG. 7 that a line section j has a higher probability of falling into the failure state than the target failure rate (1−a(i)), i.e., if Yes in Step S603 in FIG. 7, the plan execution control apparatus 1 calculates a maintenance time limit "t(j)^" as follows. That is, (a) the plan execution control apparatus 1 lists line sections whose deterioration state is dispersed less than a predetermined value in order of one having the high failure probability and assigns maintenance time limits to them, and (b) the plan execution control apparatus 1 enumerates line sections whose deterioration state distributes in a wide range (i.e., line sections that have not been inspected for a predetermined period of time) and assigns the maintenance time limits to them in order of numbers of the line sections in Step S604.

Meanwhile, the plan execution control apparatus 1 ends the process as it is if it determines that the line section "j" has a less probability of falling into the failure state than the target failure rate (i.e., if No in Step S603 in FIG. 7).

The maintenance time limit calculating step (Step S33) is carried out as described above.

<Modification of Damaged State Transition Control Step (Step S32) and Maintenance Time Limit Calculating Step (Step S33)>

Instead of the damaged state transition control step (Step S32) (see FIG. 6) and the maintenance time limit calculating step (Step S33) (see FIG. 7), their functions may be carried out as follows.

In the damaged state transition control step (Step S32), the plan execution control apparatus 1 obtains a deterioration state distribution "m(i)_0" at the end of this period from a state distribution "pre_m(i)" of the previous period, obtains the deterioration state distribution "m(i)_k" of one period ahead, two periods ahead and "k" periods ahead, e.g., up to a period of time corresponding to 10 years, by using the state transition probability and outputs as a rank {m(i)_k} of the deterioration state distribution.

In the maintenance time limit calculating process (Step S33), the plan execution control apparatus 1 obtains a time series of the failure probability {F(i)_k} for each line section "i" by obtaining a rate of becoming the "failure F" state shown in FIG. 10 among the failure probability in each period, i.e., the distribution, from the time series of deterioration state distribution {m(i)_k}. The plan execution control apparatus 1 compares it with the failure rate (1−a(a)) to find a point of time "k0" on the failure probability time series {F(i)_k} and to set "k0" as the maintenance time limit of the line section "i". It is noted that "a(i)" is the target soundness of the section i as described above.

<<Constraint Control Step (Step 34) and Itinerary Maintenance Determining Step (Step S35) (see FIGS. 3 and 4)>>

Figure 8:
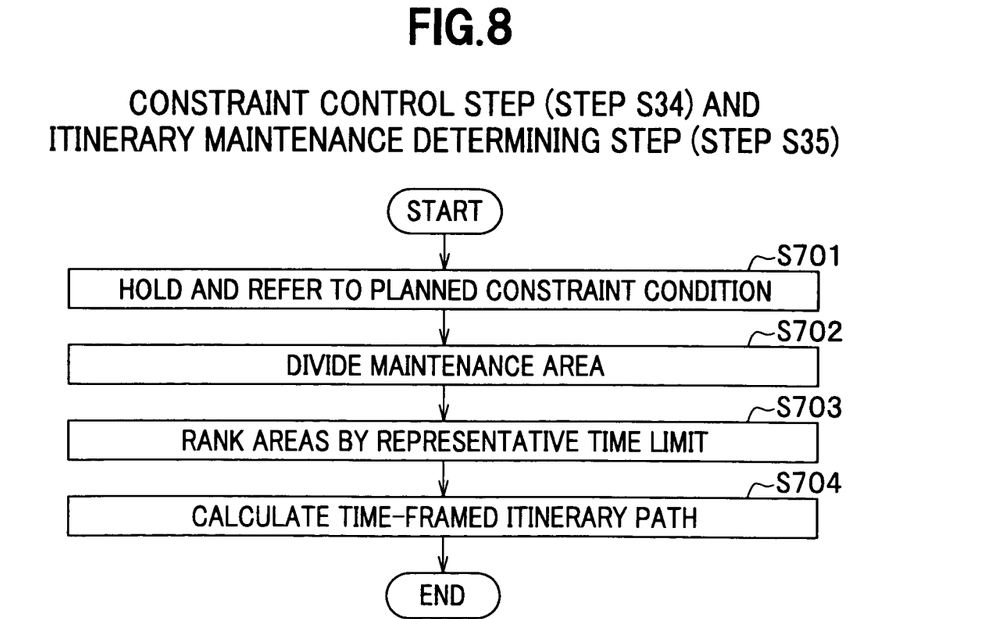
FIG. 8 is a flowchart showing a detail of a constraint control process (Step S34) and an itinerary maintenance determining process (Step S35)

Next, the constraint control process (Step S34) and the itinerary maintenance determining process (Step S35) shown in FIGS. 3 and 4 is explained along with FIG. 8.

FIG. 8 is a flowchart showing a detail of the constraint control process (Step S34) and the itinerary maintenance determining process (Step S35).

In the constraint control process (Step S34), the plan execution control apparatus 1 keeps a standard time "so)" that takes to carry out the maintenance work statistically obtained from a length, terrain, a type and the number of installations of the line section "j" and a standard traveling time "d(I, j)" that takes to travel from one previous line section "i" to the line section "j" as table data and outputs the table data in response to a request, after implementing corrections of adding a maintenance time to the traveling time "d(i, j)" caused by a bad weather or of adding a traveling time caused by a disrupted road due to a disaster for example. It is noted that a service office, i.e., a starting point of the maintenance, is inputted as a special line section 0. It is noted that preferably, the plan execution control apparatus 1 records and continuously updates the maintenance time limit, traveling of the maintenance personnel, and an acceptable workload in constraint database (not shown) stored in the storage unit 12 shown in FIG. 2 in the constraint control process (Step S34) in Step S701 in FIG. 8.

In the subsequent itinerary maintenance determining process (Step S35), the plan execution control apparatus 1 divides a maintenance area by the number of business days during a plan execution period, e.g., 20 days by the following method. Preferably, divisional lines are drawn centering on the power substation 50 so that a sum "Σs(j)" ("j" is a line section contained in a certain area) of workloads in one area is equalized as shown in FIG. 11.

Figure 11:
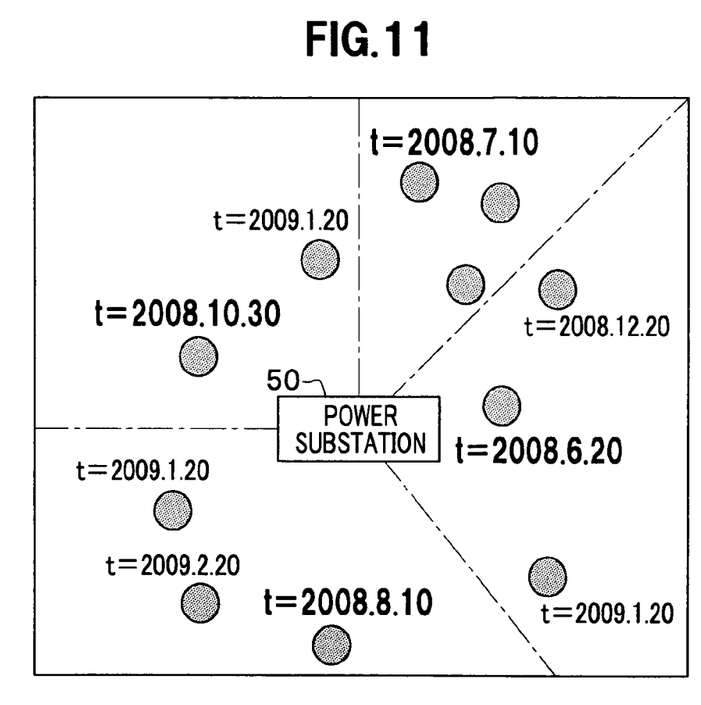
FIG. 11 is a chart showing an example in which a maintenance area is divided centering on a power substation.

FIG. 11 is a chart showing an example in which a maintenance area is divided centering on the power substation 50 and shows line sections by painted circles as nodes.

While works related to other power substations are also equalized, a power distribution region of the power substation 50 is divided into four areas (for four business days) in FIG. 11 (Step S802 in FIG. 8).

Next, the plan execution control apparatus 1 obtains a maintenance time limit representing the divided area and ranks each area by the following method. That is, the plan execution control apparatus 1 sets the most imminent maintenance time limit among the maintenance time limits of the line sections B21, B22 and so on contained in the area as the representative maintenance time limit of the whole area. Next, the plan execution control apparatus 1 assigns maintenance ranks to the area in order of urgency of the representative maintenance time limit. For instance, an area whose maintenance time limit is 2008 Jun. 20 is the most urgent and the maintenance time limit becomes the representative maintenance time limit of the whole area in FIG. 11 (Step S703 in FIG. 8).

Finally, the plan execution control apparatus 1 assigns the maintenance during the period of one area to one day in order of priority the areas. The plan execution control apparatus 1 assigns a maintenance itinerary path in a day so that a total time of a traveling distance becomes shortest in Step S704 in FIG. 8.

It is noted that instead of Steps S702 through S704 in FIG. 8, the maintenance itinerary path may be set in order of urgency of the maintenance time limit. This method is especially effective when there exists a plurality of line sections whose maintenance time limit is imminent across a plurality of areas.

The work plan {U(k)} shown in FIG. 4 is drawn up as described above.

It is noted that a more detailed work plan {U(k)} complying with an actual circumstance may be planned by adequately using the maintenance time limit, the traveling of the maintenance personnel, and the acceptable workload recorded in the constraint database in the constraint control process (Step S34) in the processes of Steps S702 through S704 in FIG. 8.

The constraint control process (Step S34) and the itinerary maintenance determining process (Step S35) are carried out as described above.

Next, operations and effects of the present embodiment is explained with reference to FIGS. 12 and 13.

Figure 12:
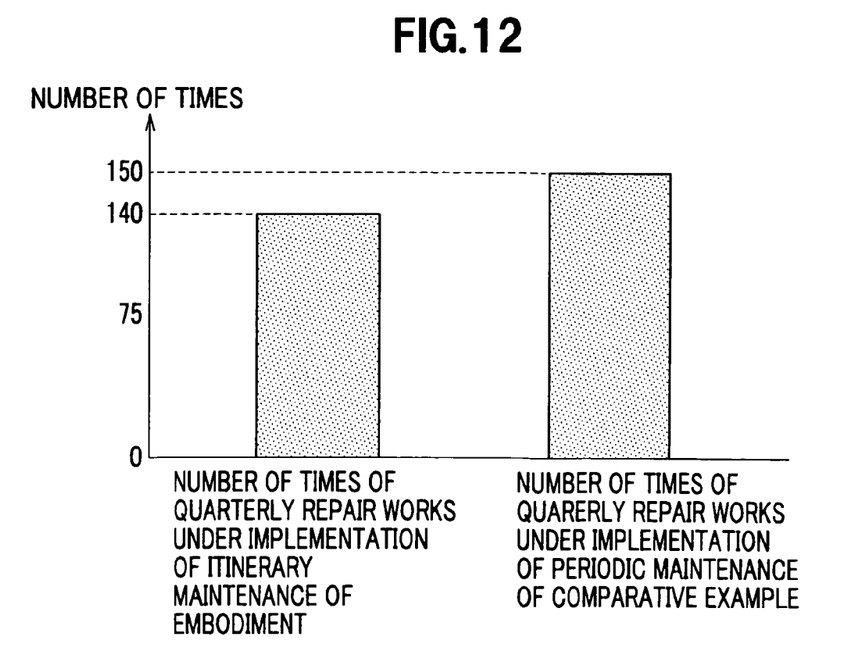
FIG. 12 is a graph showing an actual result of maintenance evaluated by the number of times of repair works conducted on damaged installations in terms of corrective maintenance.

FIG. 12 is a graph showing an actual result of maintenance evaluated by a number of times of repair conducted on damaged installations as the corrective maintenance.

As shown in FIG. 12, while the number of times of repair during a quarterly period of the comparative conventional example is about 150 times, the number is reduced to about 140 times by the present embodiment.

The reduction may be explained as follows. Uniform periodic replacement is carried out in the conventional periodic maintenance of the comparative example. This causes an increase of the number of times of repair works because maintenance is carried out also to a line section having less needs to be maintained due to the uniform periodic replacement.

In contrast, the present embodiment allows to obtain an effect of extending intervals until maintenance is carried out to the line section having less needs to be maintained more than the conventional periodic maintenance. Thus, the number of times of maintenance of the whole installations is reduced. This also cuts cost required for the repair works.

Figure 13A:
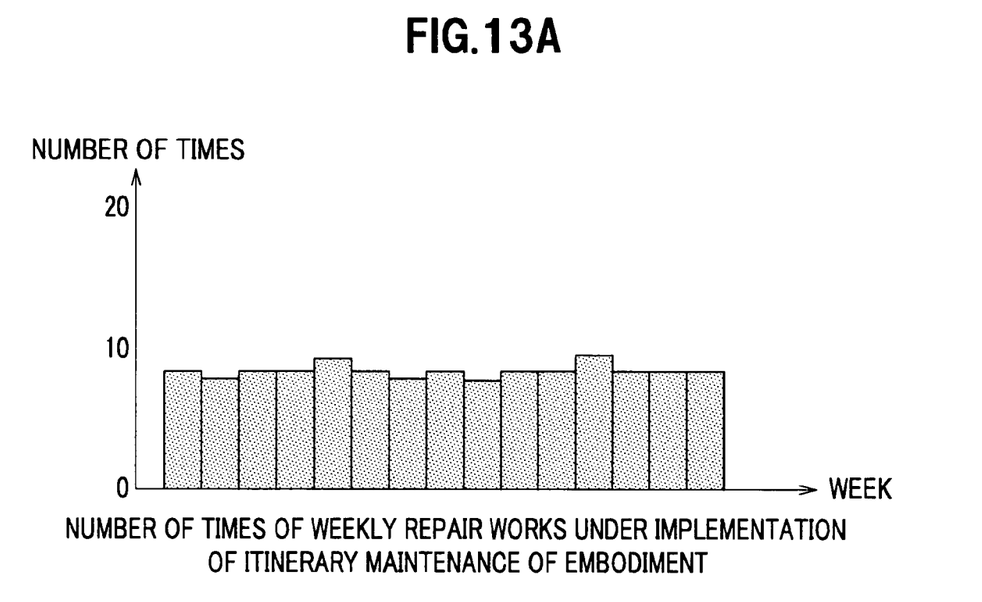
Figure 13B:
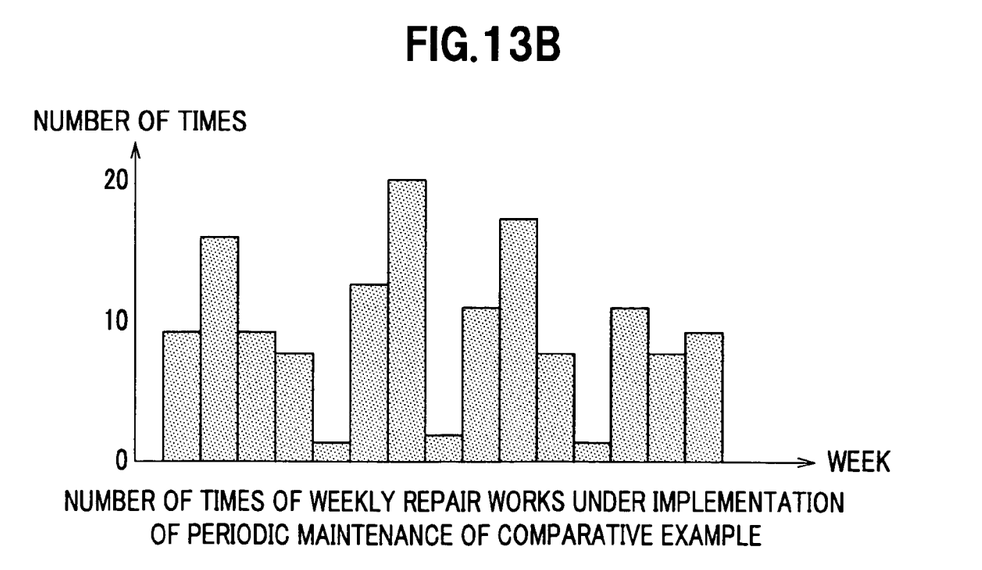

FIGS. 13A and 13B are graphs each showing the number of times of repair works per week. FIG. 13A shows a case where the itinerary maintenance of the present embodiment is carried out. FIG. 13B shows a comparative case where the conventional periodic maintenance is carried out. By comparing FIG. 13A with FIG. 13B, the number of times of repair works per week is leveled substantially to the same number of times as shown in FIG. 13A that represents the present embodiment.

This is caused by the facts that the number of corrective repair works caused by sudden accidents is reduced by maintaining the installations by setting the maintenance time limit from the target soundness and by carrying out the inspections and replacements under the planned maintenance by setting the maintenance time limit from the target soundness in the maintenance time limit calculating step (Step S33) shown in FIGS. 3 and 4 and by setting the daily maintenance route in the itinerary determining step (Step S35) shown in FIGS. 3 and 4.

In conclusion, the itinerary maintenance control system of the plan execution control apparatus for giving the instruction for maintaining the installations includes the linkage reliability calculating section for calculating the target reliability of the single or the plurality of mutually related installations, the damaged state transition control section that provides the damaged state transition structure of the installation, the maintenance time limit calculating section for calculating the time limit related to the maintenance work to meet the target level of reliability of each key point and section, the constraint control section for recognizing and recording the constraints related to traveling of maintenance personnel, the traveling workload and the acceptable workload and the itinerary maintenance determining section for calculating the itinerary schedule indicating the assignment to the object to be maintained.

(1) Preferably, the linkage reliability calculating section determines the target reliability or target soundness of the installation at least from either one of information related to the relationship of connection with the other installation, the reliability of the other installation or the data of the soundness.

Herein, the soundness is a degree regarding a probability that a certain installation is not faulty and the reliability is a degree regarding a probability if the installation performs its service, e.g., power distribution, to be performed.

It is noted that there is a case where the service cannot be performed due to a failure of a linked installation even if a certain installation itself is not faulty.

However, the linkage reliability calculating section allows the adequate reliability or soundness to be set for the installation linked to the installation required to have high reliability or soundness.

(2) Preferably, the damaged state transition control section categorizes the damaged state of the installation by the plurality of stages or by the continuous values and holds the probability of shifting from each stage to another stage as data, and preferably the probability is related with the intervals of the maintenance of the installations.

Specifically, the probability of shifting the damages from a certain stage to another stage is calculated preferably based on data of other installations of the same type or those installed under the same climate or terrain condition with the target installation or based on data inputted by an experienced person.

The damaged state transition control section permits to adequately discern the soundness of the installation including installations that cannot be always monitored. Data related to a state of an installation is, in reality, data at the time when the installation was inspected. The state between inspections of the installation whose state cannot be always monitored may be adequately handled for the first time by taking probabilistic values.

(3) Preferably, the maintenance time limit calculating section determines a maintenance time limit of each installation that meets the target reliability or target soundness of the installation by connecting the linkage reliability calculating section with the damaged state transition control section.

(4) Preferably, the constraint control section records and continuously updates the maintenance time limit, traveling of the maintenance personnel and acceptable workload in the constraint database.

(5) Preferably, the itinerary maintenance determining section divides the installations into a predetermined number of sets based on information related to at least positions, ranks the sets based on a representative value of the maintenance time limits within the respective sets and determines a maintenance itinerary route so that maintenance is carried out in order from the high rank set.

This arrangement allows the maintenance to be carried out efficiently while cutting the traveling costs.

The itinerary maintenance control system of the plan execution control apparatus of the invention permits to conduct the maintenance control realizing the maintenance meeting the constraints related to maintenance of functions of the system composed of mutually related installations and meeting the constraints related to traveling of the maintenance personnel and the acceptance of works.

Accordingly, it is possible to obtain instructions for sensitively and efficiently maintaining installations by considering the damaged state, and linkage state of the installations, the personnel traveling time, and the workload even for the installations located in a wide range.

It is noted that although the present embodiment has been explained by illustrating the case where the invention is applied to the electric power system, the invention is also widely and effectively applicable to water service, sewage system, gas, communication line and railroad installations other than the electric power system.

The invention claimed is:

1. A plan execution control apparatus configured to give an instruction to maintain a plurality of installations connected to each other, wherein
system linkage structural data is used to represent a connection structure of the plurality of the installations, and
a target reliability is used to indicate a required probability value at which each of the installations is to be normally used through a wired connection path,
the plan execution control apparatus comprising:
a linkage reliability calculating section configured, for the each of the installations, to extract one or more wired connection paths to the installation based on the system linkage structural data, wherein power is distributed through the one or more wired connection paths, to define a linkage reliability indicating a probability value at which the installation can be normally used through any one of the extracted wired connection paths, using a wired connection path reliability indicating a probability value at which at least one of the extracted wired connection paths can be normally used and a soundness indicating a probability value at which the installation is not faulty, and to calculate a target soundness of each installations such that the linkage reliability of the installation satisfies a target reliability of the installation;
a damaged state transition control section configured to provide a damaged state transition structure of the each of the installations;
a maintenance time limit calculating section configured to calculate a time limit related to a maintenance work, based on the damaged state transition structure of the each of the installations provided by the damaged state transition control section and the target soundness required for the each of the installations and calculated by the linkage reliability calculating section;
a constraint control section configured to recognize and record constraints related to traveling of maintenance personnel, a traveling workload, and a workload; and
an itinerary maintenance determining section configured to calculate an itinerary schedule indicating an assignment to an object to be maintained among the installations, based on the maintenance time limit, the constraints, the traveling workload, and the workload.

2. The plan execution control apparatus according to claim 1,
wherein the plan execution control apparatus has opening and closing data representing a faulty state of the each of the installations, and
wherein the linkage reliability calculating section is configured to extract the one or more wired connection paths to the each of the installations further based on the opening and closing data.

3. The plan execution control apparatus according to claim 1, wherein
the damaged state transition control section is configured to categorize the damaged state of the each of the installations by a plurality of stages or by continuous values and hold a probability of shifting from each stage to another stage as information, and the probability changes according to intervals between the maintenance works of the each of the installations.

4. The plan execution control apparatus according to claim 1,
wherein the constraint control section is configured to record and update the maintenance time limit, the constraints related to traveling of the maintenance personnel, and the acceptable workload as constraints, and
wherein the itinerary maintenance determining section is configured to divide the installations into a predetermined number of sets based on information related to at least locations, rank the sets, based on representative values of the maintenance time limits within the respective sets and determine a maintenance itinerary route so as to carry out maintenance in order from a high rank set.

5. A plan execution control method for giving an instruction to maintain a plurality of installations connected to each other, wherein
system linkage structural data is used to represent a connection structure of the plurality of installations, and wherein
a target reliability is used to indicate a required probability value at which each of the installations is to be normally used through a wired connection path, the method comprising:
a linkage reliability calculating operation of calculating a linkage reliability using a computer by, for the each of the installations, extracting one or more wired connection paths to the installation based on the system linkage structural data, wherein power is distributed through the one or more wired connection paths, defining the linkage reliability indicating a probability value at which the installation can be normally used through any one of the extracted wired connection paths, using a wired connection path reliability indicating a probability value at which at least one of the extracted wired connection paths can be normally used and a soundness indicating a probability value at which the installation is not faulty, and calculating a target soundness of the each of the installations such that the linkage reliability of the installation satisfies a target reliability of the installation;

a damaged state transition control operation of providing a damaged state transition structure of the each of the installations;

a maintenance time limit calculating operation of calculating, using the computer, a time limit related to a maintenance work based on the damaged state transition structure of the each of the installations from said providing and the target soundness required for the each installation from said calculating a linkage reliability;

a constraint control operation of recognizing and recording constraints related to traveling of maintenance personnel, a traveling workload, and a workload; and an itinerary maintenance determining operation of calculating, using the computer, an itinerary schedule indicating an assignment to an object to be maintained among the installations, based on the maintenance time limit, the constraints, the traveling workload, and the workload.

6. The plan execution control method according to claim 5, wherein
in the linkage reliability calculating operation, said extracting of the one or more wired connection paths to the each of the installations is further based on system opening and closing data representing a faulty state of the each of the installations.

7. The plan execution control method according to claim 5, wherein
the damaged state transition control operation comprises categorizing the damaged state of the each of the installations by a plurality of stages or by continuous values and holding a probability of shifting from each stage to another stage as information, and the probability changes according to intervals between the maintenance works of the each of the installations.

8. The plan execution control method according to claim 5, wherein
the constraint control operation comprises recording and updating the maintenance time limit, the constraints related to traveling of the maintenance personnel, and the acceptable workload as constraints, and
wherein the itinerary maintenance determining operation comprises dividing the installations into a predetermined number of sets based on information related to at least locations, ranking the sets based on representative values of the maintenance time limits within the respective sets, and determining a maintenance itinerary route so that maintenance is carried out in order from a high rank set.

9. A non-transitory computer-readable storage medium having a plan execution control program comprising instructions for execution by a computer, to maintain a plurality of installations connected to each other, wherein
system linkage structural data is used to represent a connection structure of the plurality of installations, and wherein
a target reliability is used to indicate a required probability value at which each of the installations is to be normally used through a wired connection path, the instructions including:
a linkage reliability calculating instruction for calculating a linkage reliability by, for the each of the installations, extracting one or more wired connection paths to the installation based on the system linkage structural data, wherein power is distributed through the one or more wired connection paths, defining the linkage reliability indicating a probability value at which the installation can be normally used through any one of the extracted wired connection paths, using a wired connection path reliability indicating a probability value at which at least one of the extracted wired connection paths can be normally used and a soundness of the each of the installations indicating a probability value at which the installation is not faulty, and calculating a target soundness of the each of the installations such that the linkage reliability of the installation satisfies a target reliability of the installation;

a damaged state transition control instruction for providing a damaged state transition structure of the each of the installations;

a maintenance time limit calculating instruction for calculating a time limit related to a maintenance work based on the damaged state transition structure of the each installation from said providing and the target soundness required for the each of the installations from said calculating a linkage reliability;

a constraint control instruction for recognizing and recording constraints related to traveling of maintenance personnel, a traveling workload, and a workload; and an itinerary maintenance determining instruction for calculating an itinerary schedule indicating an assignment to an object to be maintained among the installations, based on the maintenance time limit, the constraints, the traveling workload, and the workload.

10. The non-transitory computer-readable storage medium of claim 9,
wherein opening and closing data are used to represent a faulty state of the installations, and
wherein said extracting of the one or more wired connection paths to the each of the installations is further based on the opening and closing data.

11. The non-transitory computer-readable storage medium of claim 9, wherein
the damaged state transition control instruction comprises categorizing the damaged state of the each of the installations by a plurality of stages or by continuous values and holding a probability of shifting from each stage to another stage as information, and wherein the probability changes according to intervals of between the maintenance works of the each of the installations.

12. The non-transitory computer-readable storage medium of claim 9,
wherein the constraint control instruction comprises recording and updating the maintenance time limit, the constraints related to traveling of the maintenance personnel, and the acceptable workload as constraints, and
wherein the itinerary maintenance determining instruction comprises dividing the installations into a predetermined number of sets based on information related to at least locations, ranking the sets based on representative values of the maintenance time limits within the respective sets and determining a maintenance itinerary route so as to carry out maintenance in order from a high rank set.

13. The non-transitory computer-readable storage medium of claim 9, wherein the plurality of installations are power distribution installations.

14. The plan execution control apparatus of claim 1, wherein the plurality of installations are power distribution installations.

15. The plan execution control apparatus of claim 14, wherein the plan execution control apparatus is configured to receive input from the plurality of installations via a network.

16. The plan execution control apparatus of claim 15, wherein the plan execution control apparatus is further configured to receive the input via a plurality of mobile terminals adjacent to the power distribution installations in an electrical power system.

17. The plan execution control method of claim 5, wherein the plurality of installations are power distribution installations.

* * * * *